United States Patent [19]

Fielder et al.

[11] Patent Number: 4,801,479
[45] Date of Patent: Jan. 31, 1989

[54] DECORATIVE ARTICLE AND PROCESS FOR MAKING

[75] Inventors: William A. Fielder, Galloway; Charles M. Coscia, Upper Arlington, both of Ohio

[73] Assignee: The D. L. Auld Company, Columbus, Ohio

[21] Appl. No.: 129,231

[22] Filed: Dec. 7, 1987

Related U.S. Application Data

[63] Continuation-in-part of Ser. No. 025,349, Mar. 13, 1987.

[51] Int. Cl.$^4$ .............................................. B60R 13/04
[52] U.S. Cl. ........................................ 428/31; 52/716; 156/242; 428/124
[58] Field of Search ................... 428/31, 124; 52/716; 156/242

[56] References Cited

U.S. PATENT DOCUMENTS

| | | | |
|---|---|---|---|
| 4,100,010 | 7/1978 | Waugh | 428/42 X |
| 4,135,033 | 1/1979 | Lawton | 428/344 |
| 4,139,654 | 2/1979 | Reed | 427/44 |
| 4,332,074 | 6/1982 | Auld et al. | 428/31 X |
| 4,351,686 | 9/1982 | Clark | 428/451 X |
| 4,356,617 | 11/1982 | Coscia | 428/40 X |
| 4,409,264 | 10/1983 | Gilleo et al. | 428/156 X |
| 4,446,179 | 5/1984 | Waugh | 428/31 |
| 4,460,429 | 7/1984 | Coscia et al. | 156/384 |
| 4,468,425 | 8/1984 | Gilleo et al. | 428/172 |
| 4,481,160 | 11/1984 | Bree | 428/31 X |
| 4,560,596 | 12/1985 | Coscia | 428/31 |

*Primary Examiner*—Henry F. Epstein
*Attorney, Agent, or Firm*—Killworth, Gottman, Hagan & Schaeff

[57] ABSTRACT

A decorative article is made by a process in which a controlled-flatness substrate having an effective edge in a closed pattern on its surface receives a fluent plastic composition which is cast into an area defined by the edge. The fluent plastic flows to the effective edge and is then cured to form a clear plastic cap. During casting and curing the substrate is held flat and horizontal by reason of its being releasably adhered to a flat, smooth-surfaced, stiff release liner. The resulting decorative article is free of optical distortions and may be used as a covering preferably for elongated automotive components such as the external vertical pillars between the passenger compartments of automobiles.

6 Claims, 1 Drawing Sheet

DECORATIVE ARTICLE AND PROCESS FOR MAKING

CROSS-REFERENCE TO RELATED APPLICATION

This application is a continuation-in-part of application Ser. No. 025,349, filed Mar. 13, 1987, the disclosure of which is hereby incorporated by reference.

BACKGROUND OF THE INVENTION

The present invention relates to a process for making generally decorative articles having a lens cap thereon and to the articles made by this process. More particularly, it relates to a process and article in which a fluent plastic composition is cast onto a controlled-flatness substrate so as to produce a decorative article which is free of optical distortions.

Trim strips of various configurations and decorative articles and emblems have been used in the automotive industry to decorate and protect automobile body surfaces, and other surfaces in the passenger compartment. In recent years, emphasis has been placed on the use of plastic trim strips which do not corrode and which can be adhesively attached to the automobile body without fasteners.

One such trim strip is shown in U.S. Pat. No. 4,446,179, issued May 1, 1984, to Waugh and assigned to the assignee of the present invention. Waugh discloses a decorative trim strip which may consist of an elongate decorative foil member having thereon an impact-resistant overlay having radiused edges and providing a lens effect to the foil member. An adhesive is used to bond the trim strip to the surface to be decorated. Another trim strip is shown in U.S. Pat. No. 4,560,596, issued December 24, 1985, to Coscia, and also assigned to the assignee of the present invention. Coscia discloses a trim strip which includes a foil member whose upper surface is provided with a decorative pattern. The upper surface is partially covered by a weather-resistant and impact-resistant plastic overlay having radiused edges and providing a lens effect to the foil member. The plastic overlay section of the foil member is essentially coextensive with the width of the automotive body component to be decorated. When the trim strip is applied to the body component, the uncovered end portions of the foil member are wrapped around the component. In the processes of Waugh and Coscia the substrate is held flat and horizontal, preferably by vacuum hold-down, during casting and curing of the plastic overlay or lens cap.

Recently, interest has arisen in utilizing decorative articles to cover large, irregularly shaped surface areas and components on an automobile, previously, trim strips of the type shown in the Waugh and Coscia patents have been of a constant width and shape. This facilitates uniform casting of a fluent plastic composition onto the foil member prior to curing the composition to form the plastic overlay. When a decorative article which varies in width or shape is to be produced by casting a fluent plastic composition onto a substrate, ensuring that proper amounts of the composition are deposited on all portions of the substrate is important. One technique which has been used in the past to cast a fluent composition on a substrate in an irregular pattern is disclosed in U.S. Pat. No. 4,409,264, issued Oct. 11, 1983, to Gilleo et al, and U.S. Pat. No. 4,468,425, issued Aug. 28, 1984, to Gilleo et al. The Gilleo et al patents suggest that an irregularly shaped area defined by a pattern of a low surface energy compound, such as a fluorochemical, printed on the substrate surface, can receive a quantity of a liquid resin. The substrate is then wobbled or tipped in various directions, causing the liquid resin to flow over the irregularly shaped area to the area boundaries. While this may be an acceptable technique to use with some area shapes, it is not effective when the area to be covered withg a fluent composition is significantly elongated.

Copending application Ser. No. 025,349, filed Mar. 13, 1987 provides for an improved process for making a decorative article in which an elongated substrate area of varying width or shape is cast with a fluent plastic composition and cured to form a clear plastic lens cap. As with the Waugh and Coscia processes discussed above, the substrate is held substantially flat and horizontal, preferably by vacuum hold-down, during the casting and curing process.

However, it has been found that in some instances optical distortions occur in the decorative articles produced by such processes. The optical distortions, which can be described as an "orange peel" appearance, occur primarily in large area decorative trim strips having elongated areas of varying width or shape which are conformed to an automobile body component such as the verticle pillars located just to the rear of the front doors of many passenger automobiles.

Such pillars are known in the industry as "B-pillars" and "C-pillars". It has become fashionable for the covering, paint, or coating on B-pillars and C-pillars to have a smooth glass-like luster. The use of decorative articles having a lens cap as described in Waugh, Coscia and copending application Ser. No. 025,349, are particularly well suited as a covering for B-pillars and C-pillars because of the lens effect which optically enhances the surface beneath the lens cap. But, this is only true to the extent that there are no optical distortions in that covering.

Accordingly, the need exists for an improved process for making a decorative article in which a controlled-flatness substrate is cast with a fluent plastic composition to produce an elongate decorative article which is free of optical distortions.

SUMMARY OF THE INVENTION

A process according to the present invention for making decorative articles free of optical distortions comprises the steps of (a) providing a controlled-flatness substate having an effective edge in a closed pattern on the surface of the substrate, which edge circumscribes an elongated area on the surface, (b) casting a fluent plastic composition from a casting head onto the substrate within the elongated area, and (c) curing the plastic composition to form a clear plastic cap. The cap provides a lens effect over the area and thereby optically enhances the appearance of the substrate, as viewed through the lens cap.

The flatness of the substrate is controlled in part by the type of release liner to which it is releasably adhered, that release liner is a flat, smooth-surfaced, stiff one such as a stiff plastic member which will maintain the surface of the substrate to which it is adhered flat and smooth during casting and curing. No vacuum or adhesive hold-down is used. To the contrary, it has been found desirable to avoid such hold-down methods if the substrate of the present invention is to be maintained as flat and horizontal as possible during casting and curing and thereby avoid induced distortions. Rather, the release liner is the principal means for holding the substrate flat and horizontal during casting curing preferrably by the release liner is a polyester sheet, such as a Mylar polyethylene terephthalate sheet, having a thickness of approximately 0.007 to 0.012 inch, and having a smooth silicone resin treatment on the release surface thereof.

The flatness of the substrate is also controlled by the particular type of substrate used and its method of manufacture. That is, the preferred substrate is a vinyl sheet such as polyvinyl chloride sheet, having a thickness of approximately 0.002 to 0.010 inch, most preferrably 0.003 inch. Preferrably the vinyl sheet is produced by casting a vinyl plastisol on a smooth mold surface, such as a smooth plastic or metal mold surface, so that the as-coat vinyl sheet has a first surface which is a smooth "cast-side" surface when it is removed from the mold surface. The second surface, or "air" surface, tends not to be as smooth as the first cast-side surface.

It is the second, not-so-smooth, air surface, of the vinyl sheet onto which the fluent plastic of the lens cap is cast. Surprisingly, it has been found that using the not-so-smooth surface of the vinyl substrate as the decorative surface over which the lens cap is placed does not lead to optical distortions when that surface is viewed through the lens cap, but rather minimizes such distortions. That is, it has been found that the fluent plastic is self-leveling in that it smooths over the not-so-smooth surface, fills the rough areas and voids, and when cured produces an optically effective lens cap.

On the other hand, it has been found that the smoothness of the first surface (i.e., the one bearing the adhesive) which is to be adjacent to the automobile body is a key to avoiding optical distortions. Evidently, when a decorative article of the present type has a rough adhesive bearing surface and is applied to an intended base such as the "B-pillar" or "C-pillar" of an automobile, the pressure used in applying the decorative article may cause the underside roughness to be observed through the lens cap. An "orange peel" appearance often results.

But, if the first, cast-side, surface is used as the adhesive bearing surface, and a relatively thick adhesive layer is used, then, no such optical distortions occur. The smooth first surface of the vinyl substrate maintains its smoothness and the relatively thick adhesive helps cover over any imperfections in the component automobile body to which the decorative article is attached. Preferrably the adhesive is a pressure sensitive adhesive having a thickness of approximately 0.002 to 0.005 inch, and most preferrably 0.003 inch.

As mentioned, the substrate has an effective edge which circumscribes preferrably an elongated area on the second surface of the substrate. By elongated, it is meant either horizontally elongated or vertically elongated. That is, the elongated area generally has a greater length or height, depending on whether it is horizontally or vertically elongated, than width. The effective edge may be formed by a coating of an essentially non-wettable material which is peripherally contiguous with the elongated area over which the lens cap is to be applied.

The clear plastic lens cap may be formed of a flexible, abrasion resistant plastic such as polyurethane. The fluent plastic is cast over the elongated area. The casting head may be a programmed articulate head, or a series of heads which are manipulated in conjunction with one another as disclosed in copending application Ser. No. 025,349.

The casting head may be stationary and the substrate may be moved therebeneath. The rate of relative movement between the substrate and the casting head may be substantially constant and the fluent plastic composition may be dispensed from the casting head at a varying rate in dependence upon the width of the area. The rate of relative movement between the substrate and the casting head may vary in dependence upon the width of the area with the fluent plastic composition being dispensed from the casting head at a substantially constant rate.

A decorative article according to the present invention for covering an automotive component includes a flexible substrate, preferrably of approximately 0.002 to 0.010 inch thick vinyl, and most preferrably 0.003 inch thick vinyl, an essentially non-wettable material forming a closed edge pattern on the substrate, the edge pattern circumscribing preferrably an elongated area on the substrate and defining a margin area of generally uniform dimension surrounding the area. The vinyl may be a decorative solid color, a decorative colored pattern, or may have indicia printed thereon. A cured, clear plastic cap within the elongated area on the substrate provides a lens effect over the substrate, thereby enhancing the appearance of the substrate as viewed through the cap. An adhesive means is provided for mounting the article on the elongated automotive component to provide a decorative covering therefore, with the margin area being wrapped around the edges of the component. Even when mounted the decorative article of the present invention remains optically distortion free.

Accordingly, it is an object of the present invention to provide an article and a process for making an article in which a closed, effective edge pattern is formed on a controlled-flatness substrate and a fluent plastic composition is cast from a casting head onto the substrate within an area defined by the edge pattern; to provide such an article and process in which the fluent plastic flows to the effective edge, forms a positive meniscus, and cures to form a clear plastic cap which provides a lens effect over the area; and to provide such an article and process in which optical distortions are minimized.

Other objects and advantages of the invention will be apparent from the following description, the accompanying drawings and the appended claims.

DETAILED DESCRIPTION OF THE PREFERRED EMBODIMENTS

Figure 1:
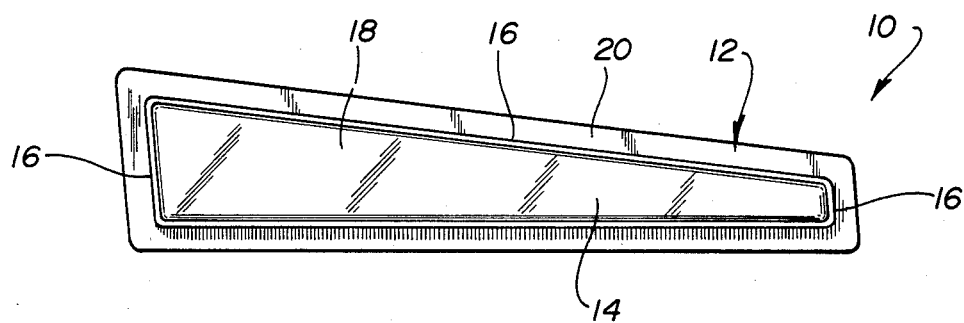
FIG. 1 is a top view of a decorative article constructed according to the present invention.
Figure 2:
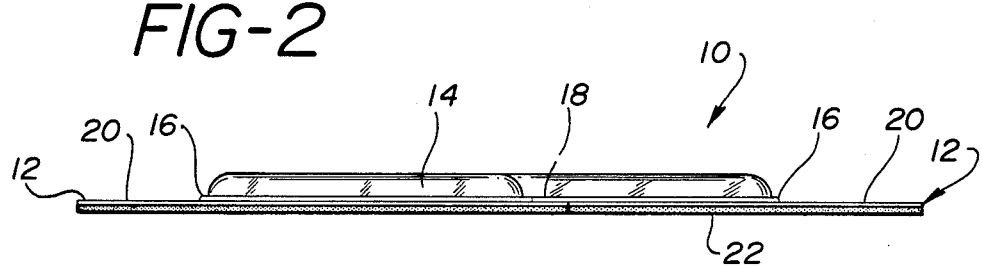
FIG. 2 is an enlarged end view of the decorative article, as seen looking right to left in FIG. 1.
Figure 3:
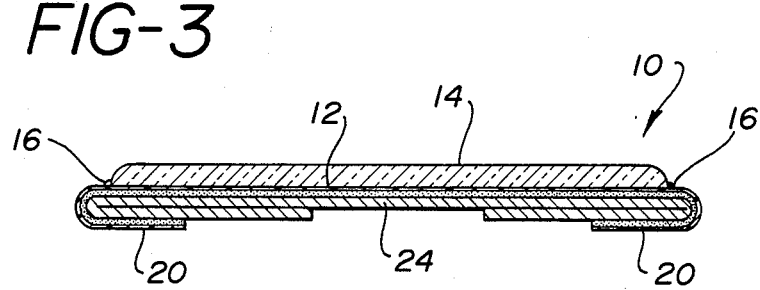
FIG. 3 is a sectional view, illustrating the decorative article as it is applied to an automotive component.

Reference is made to FIGS. 1-3 which illustrate a decorative article 10 constructed according to the present invention. This article comprises a flexible substrate 12 upon which is mounted a cured, clear plastic cap 14. The clear plastic cap 14, approximately 50 mils in thickness, provides a lens effect over the substrate 12. This enhances the appearance of any design or other ornamentation which may be provided on the surface of the substrate beneath the clear plastic cap 14. Additionally, it has been found that the clear plastic cap 14 provides an enhanced appearance for the article even if the surface of flexible substrate 12 is devoid of design or ornamentation, but rather is a solid color.

The flexible substrate 12 may be of a number of substrate materials, including a flexible foil, a metallized plastic foil or a flexible plastic sheet, but preferred is a vinyl sheet having a thickness of approximately 0.002 to 0.010 inch, and most prepferred is an approximately 0.003 inch black polyvinyl chloride sheet from 3M of St. Paul, Minn. Such vinyl sheets are manufactured by casting a black tinted polyvinyl chloride plastisol on a smooth polyester mold surface and curing. When the cured vinyl sheet is removed from the mold surface, it has a first, "cast-side", surface which is smooth and a second, "air-side", surface which is less smooth.

The flexible substrate 12 is, then, adhered to a flat, smooth-surfaced, stiff release liner (not shown) by use of adhesive layer 22. In the preferred process of the present invention, a 0.002 to 0.005 inch thick pressure sensitive adhesive, such as one of the pressure sensitive acrylic adhesives from 3M of St. Paul, Minn., and most preferrably 0.003 inch thick pressure sensitive adhesive is cast on a 0.007 to 0.012 inch thick silicone treated polyester release liner. Most preferred is a 0.003 inch thick pressure sensitive adhesive and a 0.007 inch thick silicone treated Mylar polyethylene terephthalate release liner.

After the preferred vinyl sheet is stripped from its mold surface, it is "laminated" to the adhesive bearing release liner with the first, cast-side, surface being pressed against the pressure sensitive adhesive. This places the smooth side of the vinyl sheet face to face with the smooth side of the release liner with a relatively thick layer of adhesive therebetween. The resulting laminated assembly is then sheeted to a size approximate for the decorative article being produced. As mentioned, the preferred decorative article is one for covering a elongated automobile component such as a "B-pillar" or "C-pillar". Such decorative articles preferrably have the wrap-around edge feature of the type disclosed in Coscia U.S. Pat. No. 4,560,596 and copending application Ser. No. 25,349. That wrap-around feature is shown in FIGS. 1-3 where there is shown elongated area 18 and margin area 20. Other decorative articles of different shapes may also be produced by the present process.

The clear plastic cap 14 is preferably formed by casting a fluent plastic composition in elongated area 18 on the upper surface of flexible substrate 12, which preferrably is the second air-side surface of the vinyl sheet. To retain the fluent plastic composition in the desired position during the casting operation and during subsequent curing, an essentially non-wettable material 16 forming a closed edge pattern is provided on flexible substrate 12. The thickness of material 16 is exaggerated in FIGS. 2 and 3 for purposes of clarity. The edge pattern circumscribes an elongated area 18 on the substrate and defines a margin area 20 of generally uniform dimension surrounding the elongated area 18. In the embodiment shown in FIGS. 1-3 elongated area 18 increases in width from one end thereof to the other end.

The essentially non-wettable material 16 may be any one of a number of materials which are known to limit the flow of a fluent plastic composition over a substrate surface, such as various fluorinated polymers. A number of suitable materials are discussed in U.S. Pat. No. 4,409,264, issued Oct. 11, 1983, to Gilleo et al. Preferred is a mixture of 50% polytetraefluoroethylene, 45% solvents, and 5% fillers, binders, and pigments. After application, non-wettable material 16 it is allowed to dry for one hour or more. Alternatively, an effective edge to preclude the flow of the fluent composition over the substrate surface may be provided by means of a ridge which is mechanically embossed or otherwise formed in flexible substrate 12.

The cast plastic composition forming the clear plastic cap 14 is a thermosetting material which is weather-resistant and does not yellow or cloud as a result of prolonged exposure to sunlight and which withstands strong detergent. The cast plastic should also be resistant to abrasion and impact. A number of plastics can be used for this purpose, but one which is particularly advantageous because it satisfies all of the above needs is an impact-resistant polyurethane of the type disclosed in Waugh U.S. Pat. No. 4,446,179 and Coscia U.S. Pat. No. 4,560,596. Other plastics, such as acrylics and epoxies also may be used. The plastic composition preferably is cured by heat or ultraviolet radiation, most preferably by convection heating at 110° to 150° F. Depending on the plastic used, other means such as R.F. heating and air drying may be used to harden the plastic material. During casting and curing flexible substrate 12 is held flat and horizontal by reason of the fact that during this stage of the process it is releasably adhered to the flat, smooth-surfaced, stiff release liner. That assembly is transported on a flat, smooth, level carrier through the casting station and, then curing oven, to an unloading station. Preferably no vacuum platens adhesive or other hold-down means, are used during either casting or curing.

Following unloading the decorative article may be further die cut to a furnished geometry, if necessary. It is then, shipped, still on the release liner to the user, such as the automobile parts or assembly plant. There the decrative article is removed from the release liner and mounted on the elongated automotive component.

FIG. 3 depicts the decorative article 10 mounted on an elongated automotive component 24 which may, for example, be the external vertical pillar which is just to the rear of the front doors of many passenger automobiles. It should be noted that the margin area 20 overlaps the edges of the component 24, providing a neat appearance and facilitating the application of decorative article 10 to the component.

Having described the invention in detail and by reference to preferred embodiments thereof, it will be apparent that modifications and variations are possible without departing from the scope of the invention defined in the appended claims.

What is claimed is:

1. A decorative article for covering an elongated automotive component, comprising:
   a flexible substrate of approximately 0.002 to 0.010 inch thick vinyl, having a first surface and a second surface, said flexible substrate being produced by casting vinyl plastisol on a smooth surface so as to produce a smooth cast-side surface as said first surface and an air-side surface as said second surface,
   an essentially non-wettable material forming a closed edge pattern on said substrate, said edge pattern circumscribing an area on said second surface of said substrate and defining a margin area of generally uniform dimension surrounding said area, a cured, clear plastic cap within said area on said second surface of said substrate which provides a lens effect over said substrate, thereby enhancing the appearance of said substrate as viewed through said clear plastic cap, and means for mounting the article on said automotive component to provide a decorative covering therefore, with said margin area being wrapped around the edges of said component.

2. The article of claim 1 wherein said vinyl substrate is a solid color.

3. The article of claim 1 wherein said area is an elongated one which increases in width from one and thereof to the other end.

4. The article of claim 1 wherein said clear plastic cap is formed of a flexible, abrasion-resistant polyurethane.

5. The article of claim 1 in which said means for mounting includes a layer of pressure adhesive on said first surface.

6. The article of claim 5 in which said pressure sensitive adhesive has a thickness of approximately 0.002 to 0.005 inch.

* * * * *